Patented Nov. 28, 1950

2,531,755

UNITED STATES PATENT OFFICE 2,531,755

COMPOSITION FOR CONTROLLING COCCIDIOSIS

Emanuel Waletzky, Stamford, Conn., assignor to American Cyanamid Company, New York, N. Y., a corporation of Maine No Drawing. Application December 30, 1948, Serial No. 68,400

7 Claims. (Cl. 167—53.1)

This invention deals with measures for the mitigation and control of coccidiosis and more particularly with means for the administration of these measures.

Coccidiosis is a protozoan disease that affects the intestinal tract. The disease is prevalent in poultry, sheep, and calves and has its greatest effect on immature birds and mammals. It has been estimated that 12 to 20% of all chicks hatched in the United States die from cecal coccidiosis before they reach the age of one month. While not as lethal to mammals, weight loss and downgrading of the mammalian livestock, due to coccidial infection and consequent debilitation, amounts to economic losses measured in the millions of dollars annually.

It has been discovered that certain meta-nitrobenzenesulfonamides possess a specific anticoccidial effect. These compounds are distinguished by the formula

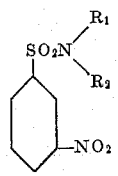

wherein $R_1$ and $R_2$ can be the same or different and represent hydrogen, halogen, and alkyl radicals. The hydrogen atoms on the amide nitrogen are acidic in character and may be replaced with a cationic salt-forming radical by simple neutralization with a base or by double decomposition. Such compounds are also active and are included within the scope of the invention. When $R_1$ and/or $R_2$ are alkyl the total carbon atom content of $R_1$ and $R_2$ may be up to about eight carbon atoms. At higher carbon contents the efficiency of the compounds falls off rapidly.

These compounds administered preferably by way of a medicated feed to the extent of 5 to 250 milligrams per kilogram of animal weight per day, the precise dosage depending on the particular compound and the severity of their infection prevent losses from coccidiosis if administration is started within three days of ingestion of the infective oocysts. These compounds, when administered at the requisite concentration show little or no toxic effects. The nutrition, rate of growth, and general well-being are not disturbed.

Concentrations of these compounds within the above range of administration while halting the severe ravages and often fatal consequences of the disease, permit mild infections, which enable the host to develop an active immunity against the infection. This immunity does protect the animal or fowl after the discontinuation of the medicated feed, even on heavily contaminated premises.

Test animals, which have ingested infected oocysts in amounts which kill more than 90% of the controls, recover and flourish if these compounds are administered up to 72 hours after infection. When the treatment has been delayed, administration should be in the range of the higher concentrations and should continue at these concentrations for at least two days. However, these compounds can be most effectively administered as prophylactic long-term continuous treatments at low concentrations in the feed.

The compounds of this invention were evaluated by comparing them with sulfaguanidine, which, to date has been one of the most effective and safest medications for the control of coccidiosis. The results show they are manyfold as effective as sulfaguanidine, and are completely safe for routine treatment, since they possess sufficient margin between therapeutic dosage and dosages which affect only slightly the rate of gain in weight of healthy animals.

The specificity of the compounds which are the subject of this invention will be apparent from a consideration of the table and discussion which follows.

Some of the compounds of the present invention which we have found effective and their approximate effectiveness as compared to sulfaguanidine are shown in the following table. The compounds were administered in various concentrations in the test ration and the sulfaguanidine ratio was established by determining the minimum amount of the test compound which affords the same protection to the test animals as does the established dosage of sulfaguanidine and dividing the latter by the former. In other words, a sulfaguanidine ratio of 20 indicates that .05 gm. of the test compound affords the same protection to the animal as would 1.00 gm. of sulfaguanidine.

Table

| Name | Sulfaguanidine Ratio |
|---|---|
| m-nitrobenzenesulfonamide | 20 |
| N-methyl-m-nitrobenzenesulfonamide | 20 |
| N,N-dimethyl-m-nitrobenzenesulfonamide | 20 |
| N-ethyl-m-nitrobenzenesulfonamide | 20 |
| N-chloro-N-ethyl-m-nitrobenzenesulfonamide | 20 |
| N,N-diethyl-m-nitrobenzenesulfonamide | 20 |
| N-n-propyl-m-nitrobenzenesulfonamide | 15 |
| N,N-di-n-propyl-m-nitrobenzenesulfonamide | 8 |
| N-iso-proply-m-nitrobenzenesulfonamide | 20 |
| N,N-di-isopropyl-m-nitrobenzenesulfonamide | 2 |
| N-(n-butyl)-m-nitrobenzenesulfonamide | 10 |
| N-iso-amyl-m-nitrobenzenesulfonamide | 3 |
| N-n-Octyl-m-nitrobenzenesulfonamide | 2 |
| Potassium N-chloro-m-nitrobenzenesulfonamide | 15-20 |
| N,N-dichloro-m-nitrobenzenesulfonamide | 10 |
| N,N-dibromo-m-nitrobenzenesulfonamide | 10 |
| N-chloro-N-ethyl-m-nitrobenzenesulfonamide | 20 |

In contrast to the compounds of this invention, many closely related compounds are either inactive or toxic or both. For example, N-acetyl-m-nitrobenzenesulfonamide and N-propionyl-m-nitrobenzenesulfonamide are both severely toxic at one-fifth the sulfaguanidine dosage. N-benzoyl-m-nitrobenzenesulfonamide and N¹-phenylbenzenesulfonamide are both completely inactive at twice the sulfaguanidine dosage. N-methyl-N-nitro-m-nitrobenzenesulfonamide and N-cyclohexyl-m-nitrobenzenesulfonamide are inactive even at three times the sulfaguanidine dosage. 3,5-dinitrobenzenesulfonamide is inactive at five times the sulfaguanidine dosage while 5-nitro-o-toluenesulfonamide is toxic at one-seventh of the normal sulfaguanidine dose. M-bromobenzenesulfonamide and p-nitrobenzenesulfonamide are both toxic, the former at one-eighth and the latter at one-fifth of the normal sulfaguanidine dosage. From the above it can be seen that the location of the nitro group at the meta position on the benzene ring is necessary for the anticoccidial effect. A great many compounds closely related to those of this invention, in addition to those mentioned above, have been tested, but were toxic, ineffective or both.

Although the birds or animals may be given direct individual doses of these compounds by oral administration one or more times a day, the preferred method of treatment is to allow the animal to feed ad libitum on its normal diet in which a compound of the invention is mixed. Such medicated feeds should contain enough of the drug so that the dosage range indicated above will be ingested by the animals in their normal daily diet.

The preferred manner of supplying the compounds of the present invention for administration is to thoroughly mix the anti-coccidial agent in the animals' feed in the concentration ranges indicated below. The higher concentration ranges may be mixed with all or selected portions of the animals' daily rations, the concentration being so regulated that the animal will ingest daily 5 to 250 mgms. of the drug per kilogram of body weight.

In the case of chickens or other fowl, such medicated feed should contain from about .005 to 0.2% of these compounds in the food when the treatment is of a long term nature, to protect the birds from the deleterious consequences of acute infection over long periods of time. Of course, if an infection has already been established, the concentrations of the compounds may safely range as high as 0.2% by weight of the daily total food intake. These compounds may also be supplied to the fowl by being dissolved in the drinking water or other liquid constituent of the diet such as skim milk, buttermilk or the like.

I claim:

1. A medicated poultry and animal feed effective in controlling coccidiosis, containing an edible substance and compounds of the general formula

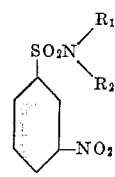

where $R_1$ and $R_2$ are chosen from the group consisting of hydrogen, cationic radicals, halogens, and alkyl radicals of less than nine carbon atoms in the concentration of at least 0.005% by weight.

2. A composition of matter effective in controlling coccidiosis, comprising feed and 0.005% to 0.2% by weight of compounds of the general formula

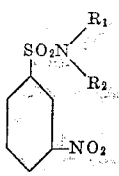

where $R_1$ and $R_2$ are chosen from the group consisting of hydrogen, cationic radicals, halogens, and alkyl radicals of less than nine carbon atoms.

3. A medicated poultry and animal feed effective in controlling coccidiosis, containing meta-nitrobenzenesulfonamide, and an edible carrier.

4. A medicated poultry and animal feed effective in controlling coccidiosis, containing a meta-nitrosulfonamidohalide, and an edible carrier.

5. An anticoccidial agent comprising animal feed and N,N-dichloro-m-nitrobenzenesulfonamide.

6. A medicated poultry and animal feed effective in controlling coccidiosis, containing an alkyl meta-nitrobenzenesulfonamide wherein the alkyl radical is less than nine carbon atoms and an edible carrier.

7. An anticoccidial agent comprising animal feed and N,N-dimethyl-m-nitrobenzenesulfonamide.

EMANUEL WALETZKY.

REFERENCES CITED

The following references are of record in the file of this patent:

UNITED STATES PATENTS

| Number | Name | Date |
|---|---|---|
| 2,279,421 | Tisdale | Apr. 14, 1942 |

OTHER REFERENCES

Rosenthal: Public Health Reports, vol. 58, pages 5 to 9, Jan. 1, 1943. (Copy in Scientific Library.)